United States Patent [19]
Kamiguchi et al.

[11] Patent Number: 4,849,678
[45] Date of Patent: Jul. 18, 1989

[54] METHOD OF AUTOMATIC ZERO ADJUSTMENT OF AN INJECTION-MOLDING MACHINE AND AN APPARATUS THEREFOR

[75] Inventors: Masao Kamiguchi, Houya; Yuichi Hosoya, Hachioji, both of Japan

[73] Assignee: Fanuc Ltd, Minamitsuru, Japan

[21] Appl. No.: 163,964

[22] PCT Filed: Jun. 17, 1987

[86] PCT No.: PCT/JP87/00395
§ 371 Date: Feb. 2, 1988
§ 102(e) Date: Feb. 2, 1988

[87] PCT Pub. No.: WO87/07866
PCT Pub. Date: Dec. 30, 1987

[30] Foreign Application Priority Data
Jun. 19, 1986 [JP] Japan .................................. 61-14132

[51] Int. Cl.$^4$ .............................................. B29C 45/76
[52] U.S. Cl. ..................................... 318/572; 264/40.1; 264/40.5; 264/40.7; 318/567; 318/575; 364/167.01; 364/476; 425/145; 425/150; 425/166
[58] Field of Search ...................... 318/567, 572, 575; 264/40.1, 40.5, 40.7, 328.1; 425/135, 136, 138, 139, 145, 147, 149, 150, 151, 162, 167, 168, 171, 214; 364/476, 167.01

[56] References Cited
U.S. PATENT DOCUMENTS
4,501,999 2/1985 Kohzai et al. ...................... 318/572
4,682,089 7/1987 Tamari .............................. 318/563

FOREIGN PATENT DOCUMENTS
51417 5/1982 European Pat. Off. ............ 318/572
61-120718 6/1986 Japan .

Primary Examiner—Jan H. Silbaugh
Assistant Examiner—Jill L. Heitbrink
Attorney, Agent, or Firm—Staas & Halsey

[57] ABSTRACT

A method and an apparatus for automatic zero adjustment of an injection-molding machine, in which an axis driven by a servomotor can be automatically returned to its origin with accuracy and speed. When a one-revolution signal is produced after the axis reaches a deceleration position, a preset coordinate position of a reference point is written in a current-value register. Subsequently, when the axis driven toward an absolute position reaches the absolute position, the preset coordinate position of the reference point is corrected with use of a correction value calculated on the basis of a known coordinate position of the absolute position and the register value. When the axis driven toward the reference point reaches the corrected position, the preset reference point coordinate position is written in the current-value register.

7 Claims, 3 Drawing Sheets

4,849,678

METHOD OF AUTOMATIC ZERO ADJUSTMENT OF AN INJECTION-MOLDING MACHINE AND AN APPARATUS THEREFOR

TECHNICAL FIELD

The present invention relates to a method of zero adjustment for drive axes, such as an injection axis, clamp axis, ejector axis, etc., of an injection-molding machine and an apparatus for effecting the same.

BACKGROUND ART

In injection-molding machines using oil pressure for drive sources for its injection unit, clamping (mold clamping) unit, etc., the strokes of a screw for injection and a clamp axis depend on the stroke of associated hydraulic cylinders, and the origin positions or zero points of the screw and the clamp axis are determined mechanically by themselves.

In injection-molding machines driven by means of servomotors, however, the rotation of the servomotors is subject to no mechanical restrictions. Therefore, the origin positions of an injection axis, clamp axis, and ejector axis, which are driven by these servomotors, cannot be uniformly determined mechanically. Unless the origin points of the axes driven by the servomotors are positioned accurately with respect to the body of the injection-molding machine, however, the injection-molding machine body and equipment associated therewith may be possibly damaged. Unless the position of the injection axis, for example, or the screw position, relative to the injection-molding machine body, is detected accurately, and if the screw is not positioned accurately, the screw may possibly run against a heating cylinder, thereby damaging the screw or heating cylinder. Also in cushion amount adjustment or in injection-speed switching control, the position of the screw relative to the injection-molding machine body must be detected accurately for screw positioning.

Likewise, unless the clamp axis is positioned accurately with respect to the injection-molding machine body, a mold may be possibly damaged.

Generally, zero return operation along an axis driven by means of a servomotor is effected by locating the origin of the axis at a reference point which is preset on a predetermined coordinate position in a coordinate system of the machine body. The reference point is set to the position which is reached by the axis when the servomotor is rotated through a predetermined angle from a rotational position corresponding to an invariable coordinate position in the coordinate system of the injection-molding machine. More specifically, the injection-molding machine typically comprises a position detecting system which includes an absolute-value pulse coder adapted to deliver a signal indicative of one revolution of the servomotor with every arrival of a grid at a predetermined rotational position, a deceleration dog attached to the injection-molding machine body, and a sensor attached to the axis for detecting the decelerated dog. The position detecting system is adjusted so that the grid of the pulse coder takes a position opposite to the predetermined rotational position when a deceleration dog signal, delivered from the sensor, goes low while the axis is passing the deceleration dog during the return to the origin. Meanwhile, the reference point is set to the position reached by the axis when the servomotor makes a half turn after the deceleration dog signal diminishes.

Accordingly, if the axis position after the zero return is deviated from the reference point during fine adjustment or the like of gears, driving belt, etc. of a drive system for the axis, the rotational position of the servomotor, after the zero return, is at a halfturn distance, in both positive and negative directions, from the position corresponding to the reference point, thus falling within a one-revolution range. Zero point adjustment can be performed within this range.

In this zero adjustment, the axis is moved toward the reference point, whereupon the deceleration dog signal diminishes. When a one-revolution signal is then produced, the axis is stopped. If the stop position of the axis is deviated from the set reference point, the position of the deceleration dog or the sensor for deceleration dog detection, e.g., a limit switch, is manually corrected by shifting the location of the dog or the sensor so that the stop position coincides with the set reference point.

In machine tools, robots, etc., whose axes are driven by means of servomotors, their accuracy is subject to no special problems, in general, even though the zero return is based on the conventional method as aforesaid. In injection-molding machines, however, the positional relationships between the machine body and the axes to be driven require a strict accuracy in microns. Therefore, the individual axes must be positioned accurately with respect to the coordinate system of the injection-molding machine body. Thus, accurate zero return is needed.

According to the aforementioned system in which the axes are positioned manually at the reference position, however, high-accuracy zero adjustment cannot be achieved. Moreover, the adjustment requires much time, and cannot be performed automatically.

SUMMARY OF THE INVENTION

Accordingly, the object of the present invention is to provide a method and an apparatus for automatic zero return, capable of automatic zero return with accuracy and speed, in an injection-molding machine whose injection axis, clamp axis, ejector axis, etc., are driven by means of servomotors.

In order to achieve the above object, a method of automatic zero adjustment according to the present invention comprises steps of: (a) driving a servomotor to move an axis of an injection-molding machine from a zero return start position toward a reference point; (b) storing a preset coordinate position of the reference point as a current coordinate position of the axis when the servomotor further rotates to take a predetermined rotational-angle position after the axis reaches a deceleration start position situated short of the reference point; (c) updating the memory value of the current coordinated position while moving the axis toward an absolute position whose coordinate position is known; (d) correcting the preset reference point coordinate position with use of a correction value calculated on the basis of the memory value of the current coordinate position and the known coordinate position of the absolute position when the axis reaches the absolute position; (e) updating the memory value of the current coordinate position while moving the axis toward the reference point; and (f) replacing the memory value with the preset reference point coordinate position when the memory value reaches the corrected reference point coordinate position.

An automatic zero point adjusting apparatus according to the present invention comprises: axis position detecting means for severally detecting the arrival of an axis, driven by means of a servomotor of an injection-molding machine, at a zero origin return start position, a deceleration start position, and an absolute position of the axis; motor rotational-position detecting means adapted to produce a one-revolution signal with every revolution of the servomotor; current-value memory means whose memory value is updated as the axis moves; memory control means for renewing the memory value of the current-value memory means; and correcting means for correcting the preset reference point coordinate position with use of a correction value calculated on the basis of a preset coordinate position of the absolute position and the memory value of the current-value memory means at the time of the arrival of the axis at the absolute position, the current-value memory means being adapted to store the preset reference point coordinate position when the one-revolution signal is first produced after the axis reaches the deceleration start position, and the memory value of the current-value memory means being replaced with the preset reference point coordinate position when the axis reaches the corrected reference point coordinate position.

According to the present invention, as described above, if the position of the axis relative to the body of the injection-molding machine is dislocated due to adjustment of gears, belt or the like of a drive system for the axis, which is driven by means of the servomotor, the amount of dislocation is detected accurately and automatically to the minimum unit of movement of the servomotor. Also, the dislocation is automatically corrected for the adjustment of the origin position of the axis. Thus, the axis is accurately positioned with respect to the injection-molding machine, so that accurate zero return can be effected with an accuracy in microns which is required by the injection-molding machine.

DESCRIPTION OF THE PREFERRED EMBODIMENT

Best Mode of Carrying Out the Invention

Figure 1:
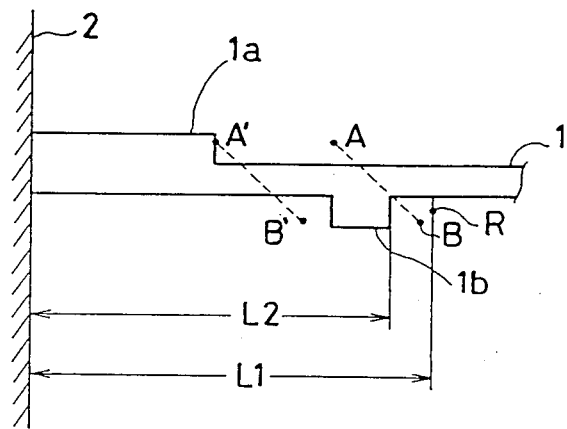
FIG. 1 is a diagram illustrating positional relationships between dogs and limit switches of a zero point adjusting apparatus according to an embodiment of the present invention.

FIG. 1 shows the positional relationships between dogs and limit switches, with respect to an injection axis, as an example, in an apparatus to which is applied a method of automatic zero adjustment according to an embodiment of the present invention. In FIG. 1, numeral 2 denotes a stationary platen fixed to a base (not shown) of the housing of an injection-molding machine. A dog 1, which is fixed to the stationary platen 2, includes a zero return start dog 1a, used to set a zero return start position mentioned later, and a deceleration start dog 1b for setting a deceleration start position and an absolute position mentioned later. Symbols A and B designate limit switches which serve as sensors for detecting the zero return start dog 1a and the deceleration start dog 1b, respectively. Both the limit switches A and B are fixed to the injection axis or screw axis 100. The dogs 1a and 1b are arranged so that the limit switch B is situated on the same side of the deceleration start dog 1b as the stationary platen 2 when the zero return start dog 1a is detected by the limit switch A. Thus, there is a positional relationship (indicated by symbols A' and B' in FIG. 1) such that the limit switch B cannot step on the deceleration start dog 1b. A reference point R is situated at a position on the right of the deceleration start dog 1b, as in FIG. 1, and at a distance L1 from the stationary platen 2. In other words, the coordinate position of the reference point R, with respect to the screw-axis moving direction, is set to L1. When the injection axis 100, positioned accurately, reaches the right-hand end or trailing end of the deceleration start dog 1b, a grid G (FIG. 2) of an absolute-value pulse coder attached to a servomotor takes a rotational position diametrically opposite to a predetermined rotational position (uppermost rotational position) where a one-revolution signal mentioned later is produced. In connection with this, the coordinate position L1 of the reference point R is set so as to be coincident with the moved position of the injection axis reached when the grid G reaches the uppermost position, as the servomotor makes a half turn after the injection axis 100 reaches the trailing end of the deceleration start dog, and when the one-revolution signal is delivered from the pulse coder.

In the present embodiment, the position of the trailing end of the deceleration start dog 1b is used as an absolute position L2, and the limit switch B doubles as a sensor for detecting the absolute position L2.

Figure 2:
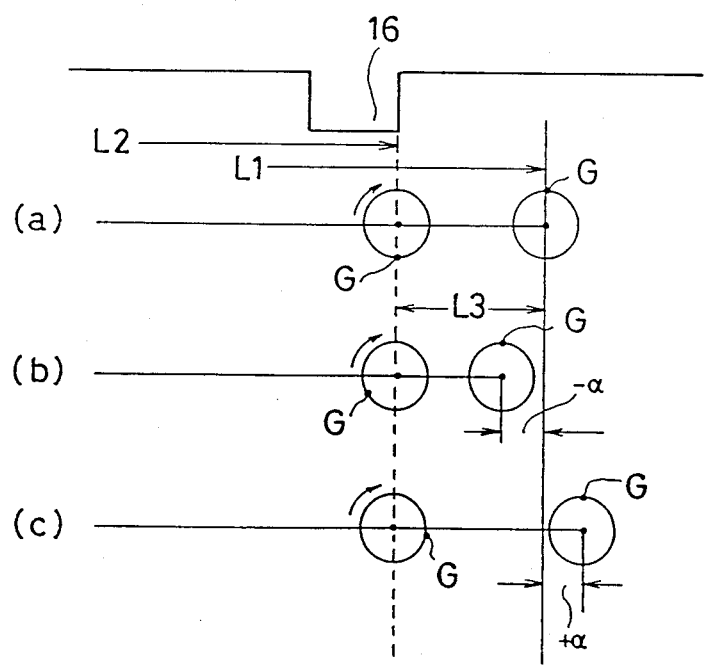
FIGS. 2(a)-2(c) are diagrams illustrating the principle of operation of the embodiment of the present invention.

FIG. 2 is a diagram for illustrating the principle of operation of the present embodiment. In FIG. 2, symbol G designates the grid of the absolute-value pulse encoder P which is attached to the servomotor M used to drive a injection axis. The pulse encoder produces a one-revolution pulse when the grid G reaches the uppermost rotational position as illustrated. In FIG. 2, (a) shows a state such that the injection axis is positioned normally, while (b) and (c) show cases in which the injection axis is dislocated.

If the injection axis is positioned accurately, as indicated by (a) in FIG. 2, and it moves from left to right of FIG. 2, when the limit switch B reaches the trailing position of the deceleration start dog 1b, the grid G is situated in its lowermost rotational position. Thereafter, when the rotating shaft of the pulse coder makes an additional half turn so that the grid G reaches the uppermost position where the one-revolution pulse is delivered from the pulse coder, the injection axis reaches the reference point coordinate position L1.

However, if the injection axis is dislocated after gears or belt of a drive system for the injection axis of the injection-molding machine is adjusted, the grid G does not take the uppermost rotational position or one-revolution pulse generating position, although the reference point coordinate position L1 is reached by the injection axis, as indicated by (b) and (c) in FIG. 2. If the injection axis position at the point of time of generation of the one-revolution pulse is set as the reference point in a current-value register, a difference $\pm a$ between the reference point coordinate position L1 and the one-revolution pulse generating position is produced as an error, as indicated by (b) and (c) of FIG. 2.

Thereupon, according to the present embodiment, the preset reference point coordinate position L1 is written in the current-value register R when the one-revolution signal is produced after the limit switch B slides down the deceleration start dog 1b, that is, when a tentative reference point is reached. Thus, a tentative coordinate system for zero adjustment is established. Subsequently, the injection axis is moved from right to left of FIG. 2 until the limit switch B steps on the deceleration start dog 1b. Then, the absolute position L2 of the trailing end of the deceleration start dog 1b is compared with the value in the current-value register R, which is indicative of the injection axis position reached when the limit switch B reaches the dog 1b. Thus, the error $\pm\alpha$ is obtained. The coordinate position of the reference point in the tentative coordinate system is detected with use of the obtained error $\alpha$. When the injection axis reaches the reference point coordinate position in the tentative coordinate system, moreover, the reference point coordinate position L1 is set in the current-value register R, that is, the ordinary coordinate system is restored. Thus, return to the origin is finished.

The zero return operation of the present invention will now be described on the assumption that there is a relationship shown in FIG. 2(c) between the dog and the rotational position of the grid, for example. Let it be supposed that the distance between the normal reference point and the trailing end of the deceleration start dog 1b is L3. When the first one-revolution pulse is produced after the limit switch B slides down the deceleration start dog 1b, the reference point coordinate position L1 is set in the current-value register R, although the actual absolute coordinate position of the axis at that time is L1+$\alpha$ (FIG. 2(c)). Accordingly, the axis is driven in the opposite direction (from right to left of FIG. 2) thereafter, and the value in the current-value register R obtained when the limit switch B is moved so as to step on the deceleration start dog 1b is L1−(L3+$\alpha$). Meanwhile, this position is the absolute coordinate position L2. In order to examine the error at this point of time, the absolute coordinate position L2 (=L1−L3) is subtracted from the value in the current-value register R, whereupon we obtain $$\{L1-(L3+\alpha)\}-L2=L1-L3-\alpha-L2=-\alpha$$

Thus, the result of subtraction, which is to be zero if the axis is returned normally to the reference point coordinate position L1, is found to be −$\alpha$, that is, a value smaller than the true value by $\alpha$ is set in the current-value register R. In other words, the reference point is situated at a position deviated toward the deceleration start dog 1b by a distance $\alpha$ from the axis position corresponding to the aforesaid one-revolution generating position. As shown in FIG. 2 (c)-; after all, if the axis is moved so that the value in the current-value register becomes equal to L1−$\alpha$, which is obtained by adding a correction value −$\alpha$ to the reference point coordinate position L1, after switch B defects position L2—and if the reference point coordinate position L1 is written in the current-value register R when the destined position is reached (i.e. when axis moved to right by the amount L1-9) then a correct reference point coordinate position is stored in the current-value register R.

Figure 3:
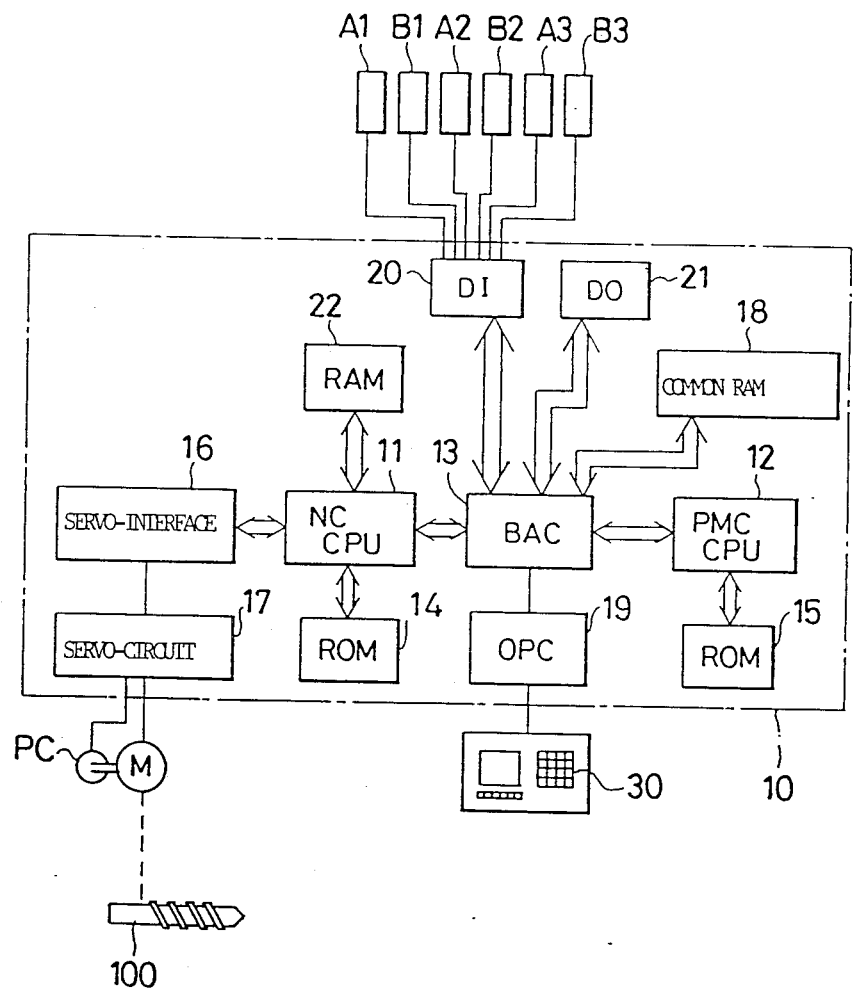
FIG. 3 is a block diagram showing the principal part of the zero point adjusting apparatus according to the embodiment of the present invention.

FIG. 3 is a block diagram showing the principle part of the injection-molding machine which, exemplifying the present invention, performs the aforementioned operation. In FIG. 3, numeral 10 denotes a numerical control unit (hereinafter referred to as NC unit) for controlling the injection-molding machine. The NC unit 10 includes a microprocessor (hereinafter referred to as CPU) 11 for NC, and a CPU 12 for a programmable machine controller (hereinafter referred to as PMC). The PMCCPU 12 is connected with a ROM 15 which stores a zero return program, mentioned later, a sequence program for various operations of the injection-molding machine, etc. The NCCPU 11 is connected with a ROM 14 which stores a control program for generally controlling the injection-molding machine. The NCCPU 11 is also connected, through a servo-interface 16, with servo-circuits for controlling the drive of servomotors for various axes for injection, clamping, screw rotation, ejector operation, etc. Among the servomotors, only the motor for the injection axis is designated by symbol M. Among the servo-circuits, only the circuit associated with the motor M is denoted by numeral 17. Symbol PC designates an absolute-value pulse coder attached to the servomotor M. Those servomotors, absolute-value pulse coders, and servo-circuits associated with the other axes than the injection axis 100 are omitted in FIG. 3.

Numeral 18 denotes a nonvolatile common RAM which, including a backup power source, stores programs for controlling the various operations of the injection-molding machine, various set values, parameters, etc. Numeral 13 denotes a bus-arbiter controller (hereinafter referred to as BAC), which is connected with the respective buses of the NCCPU 11, the PMCCPU 12, the common RAM 18, an input circuit 20, and an output circuit 21. The bus to be used is controlled by means of the BAC 13. The BAC 13 is also connected with a manual-data input device 30 with a display (hereinafter referred to as CRT/MDI) through an operator panel controller 19. Numeral 22 denotes a RAM used for tentative storage of data during various processes of operation by the NCCPU 11. Also, the PMCCPU 12 can be shown connected selectively with a RAM. In the present embodiment, no RAM is connected to the PMCCPU 12.

Symbols A1 and B1 designate limit switches attached to the injection axis 100; A2 and B2, limit switches attached to a clamp axis (not shown); and A3 and B3, limit switches attached to an ejector axis (not shown). The limit switches A1, A2 and A3, which correspond to the limit switch A of FIG. 1, are used to detect the zero return start dog, out of the dogs provided individually for the axes. On the other hand, the limit switches B1, B2 and B3, which correspond to the limit switch B of FIG. 1, are used to detect the deceleration start dog, out of the dogs provided individually for the axes. These limit switches A1 to A3 and B1 to B3 are connected to the input circuit 20.

Figure 4:
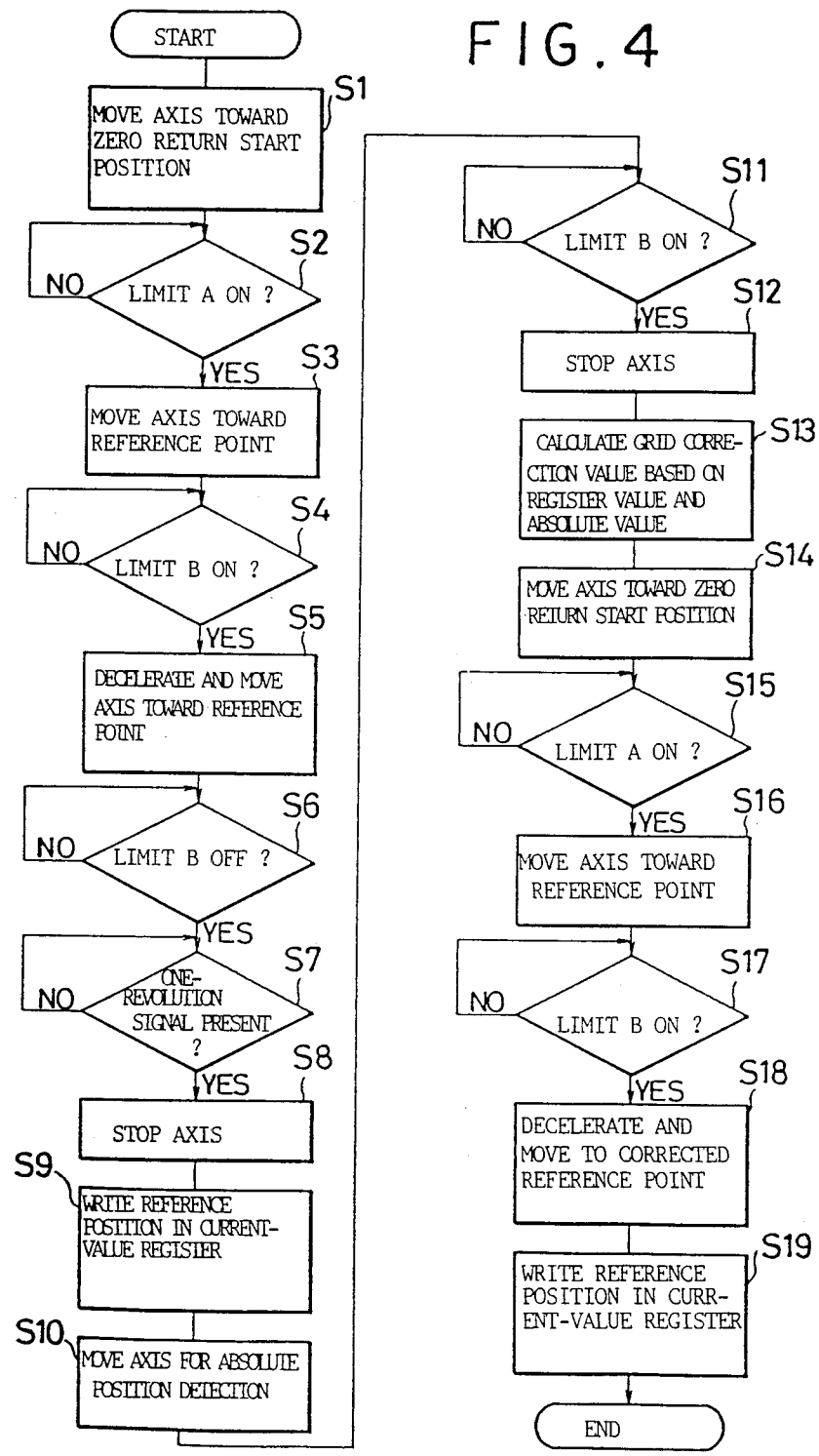
FIG. 4 is a flow chart showing the operation of the apparatus of FIG. 3.

Referring now to the operational flow chart of FIG. 4, the operation of the present embodiment will be described.

If a command for zero return is inputted through the CRT/MDI 30, the PMCCPU 12 reads out the zero return program from the ROM 15, thereby successively returning the individual axes to their origins. When starting the process with the injection axis 100, the PMCCPU 12 drives the motor M for the injection axis with the aid of the BAC 13, NCCPU 11, servo-interface 16, and servocircuit 17, thereby moving the injection axis toward the zero return start position (Step S1). Then, the PMCCPU 12 determines, through the medium of the BAC 13 and the input circuit 20, whether or not a detection signal is inputted which is delivered when the zero return start dog 1a is detected by the limit switch A1 (Step S2). If the limit switch A1 is turned on so that the detection signal is inputted, the servomotor M is reversed to move the injection axis toward the reference point (Step S3).

As seen from FIG. 1, the limit switch B1 is off when the limit switch A1 is on. The PMCCPU 12 monitors, through the BAC 13 and the input circuit 20, to determine whether or not the limit switch B1 is turned on by stepping on the deceleration start dog 1b (Step S4). If the limit switch B1 is turned on, the PMCCPU 12 decelerates the servomotor M, and causes it to advance the axis movement toward the reference point. Then, the PMCCPU 12 determines whether or not the limit switch B1 is turned off by sliding down the deceleration start dog (Step S6). Thereafter, when the grid reaches the uppermost rotational position as the rotating shaft of the absolute-value pulse coder P rotates, the one-revolution pulse is delivered from the pulse coder P. When the CPU 12 detects this through the BAC 13, NCCPU 11, servo-interface 16, and servocircuit 17 (Step S7), it stops the drive of the injection axis (Step S8), and stores the current-value register R in the common RAM 18 with the reference point coordinate position L1 which is set and stored in the common RAM 18 (Step S9). This injection axis stop position is a tentative reference position. Then, the servomotor M is driven to move the axis in the direction for absolute position detection. In the present embodiment, the deceleration start dog 1b doubles as a dog for absolute position detection, so that the injection axis moves to the left of FIG. 1 (Step S10). The CPU 12 monitors to determine whether or not an ON signal from the limit switch B1 is inputted (step S11). If the limit switch B1 steps on the deceleration start dog 1b to be turned on, the movement of the injection axis is stopped (Step S12). Then, the absolute position L2 set and stored in the common RAM 18 is subtracted from the value of the current-value register R to obtain the grid correction value (indicated by $+\alpha$ or $-\alpha$ in FIG. 2) (Step S13). Subsequently, the axis is moved again toward the zero return start position (Step S14). When the limit switch A is turned on (Step S15), the servomotor M is reversed to move the axis toward the reference point (Step S16). If the limit switch B1 steps on the deceleration start dog 1b in the same manner as aforesaid (Step S17), the speed of the axis movement is reduced. Thereafter, the axis is moved until the value of the current-value register R, which is updated as the axis moves, attains a value corresponding to a corrected reference point coordinate position, that is, a new reference point coordinate position which is obtained by adding the grid correction value $\alpha$, calculated in Step S13, to the reference point coordinate position L1 stored in the common RAM 18 (Step S18). When the aforesaid position is reached, the reference point coordinate position L1 is written in the current-value register (Step S19). Thus, when the injection axis is in the correct reference point coordinate position L1, the reference point coordinate position L1 is written in the current-value register R, and the injection axis is located accurately in a correct position relative to the injection-molding machine.

When the zero return operation for the injection axis is completed in this manner, the same process is then executed for each of the clamp axis and the ejector axis. Thus, the injection axis, clamp axis, and ejector axis are returned automatically to their respective origins in succession.

In the embodiment described above, the value stored as the absolute position in the common RAM 18 is used as the position of the trailing end of the deceleration start dog 1b on the reference-point side. Alternatively, however, the position of the trailing end of the zero return start dog 1b may be used as the absolute position, and the limit switch A may be given a function as a sensor for absolute position detection, as well as the function for zero return position detection. In this case, the limit switch A must only be checked in place of the limit switch B in Step S11 of FIG. 4, and Steps S14 and S15 may be omitted. More specifically, if the limit switch A is on, then the limit switch B is already situated on the same side of the deceleration start dog 1b as the front plate 2, after having stepped over the dog 1b. Thus, Steps S14 and S15 can be omitted.

The dog for the absolute position and the sensor, such as a limit switch, for detecting the dog may be provided separately from those for the zero return start or deceleration start. In the aforementioned embodiment, moreover, the dog 1 is fixed to the injection-molding machine body, and the sensors or limit switches are fixed to the axes. In contrast with this, however, the limit switches or sensors may be fixed to the injection-molding machine body. In this case, the dog 1 is fixed to the axes. Instead of using the limit switches as the sensors, furthermore, photoelectric tubes of proximity switches may be used as the sensors. In this case, the dog must be constructed corresponding to these sensors.

We claim:

1. In a method of zero return for an axis driven by means of a servomotor of an injection-molding machine, a method of automatic zero adjustment of an injection-molding machine, comprising the steps of:
    (a) driving the servomotor to move the axis from a zero return start position toward a reference point;
    (b) storing a preset coordinate position of the reference point as a current coordinate position of the axis when the servomotor further rotates to take a predetermined rotational-angle position after the axis reaches a deceleration position situated short of said reference point the current coordinate position having a memory value;
    (c) updating the memory value of said current coordinate position while moving the axis toward an absolute position whose coordinate position is known;
    (d) correcting said preset coordinate position of the reference point using a correction value calculated on the basis of the memory value of said current coordinate position and the known coordinate position of said absolute position when the axis reaches said absolute position;
    (e) updating the memory value of said current coordinate position while moving the axis toward said reference point; and
    (f) replacing said memory value with said preset coordinate position of the reference point when said memory value reaches said corrected reference point coordinate position.

2. An automatic zero point adjusting apparatus for an axis driven by means of a servomotor of an injection-molding machine, said apparatus comprising:
    axis position detecting means for severally detecting the arrival of the axis at a zero return start position, a deceleration position, and an absolute position of the axis;

motor rotational-position detecting means adapted to produce a one-revolution signal with every revolution of the servomotor;

current-value memory means for storing a memory value that is updated as the axis moves;

memory control means for renewing the memory value of said current-value memory means; and correcting means for correcting said preset reference point coordinate position using a correction value calculated on the basis of a preset coordinate position of the absolute position and the memory value of said current-value memory means at the time of the arrival of the axis at said absolute position, said current-value memory means being adapted to store said preset reference point coordinate position when said onerevolution signal is first produced after the axis reaches said deceleration position, and the memory value of said current-value memory means being replaced with said preset reference point coordinate position when the axis reaches said corrected reference point coordinate position.

3. An automatic zero point adjusting apparatus of an injection-molding machine according to claim 2, wherein said injection-molding machine includes a body, and said axis position detecting means comprises:

means for individually detecting said zero return start position, said deceleration position, and said absolute position, and including a dog fixed to one of the body and the axis, and a sensor fixed to the other one of the body and the axis and adapted to detect said dog.

4. An automatic zero point adjusting apparatus according to claim 2, wherein the absolute position corresponds to the deceleration position.

5. An automatic zero point adjusting apparatus according to claim 2, wherein the absolute position corresponds to the zero return start position.

6. An automatic zero point adjusting apparatus of an injection-molding machine according to claim 3, wherein said absolute position is set to the same position as said deceleration position, and both said positions are detected by common detecting means.

7. An automatic zero point adjusting apparatus of an injection-molding machine according to claim 3, wherein said absolute position is set to the same position as said zero return start position, and both said positions are detected by common detecting means.

* * * * *